(12) United States Patent
Toyoshima

(10) Patent No.: US 8,350,816 B2
(45) Date of Patent: Jan. 8, 2013

(54) DISPLAY DEVICE AND ELECTRONIC APPARATUS

(75) Inventor: Yosuke Toyoshima, Shiojiri (JP)

(73) Assignee: Sony Corporation, Tokyo (JP)

( * ) Notice: Subject to any disclaimer, the term of this patent is extended or adjusted under 35 U.S.C. 154(b) by 1008 days.

(21) Appl. No.: 12/136,237

(22) Filed: Jun. 10, 2008

(65) Prior Publication Data

US 2009/0115737 A1 May 7, 2009

(30) Foreign Application Priority Data

Nov. 5, 2007 (JP) ................................. 2007-287001

(51) Int. Cl.
*G06F 3/041* (2006.01)
(52) U.S. Cl. ........................................................ 345/173
(58) Field of Classification Search .................... 345/173
See application file for complete search history.

(56) References Cited

U.S. PATENT DOCUMENTS

| 5,329,239 | A | * | 7/1994 | Kindermann et al. | ......... 324/678 |
| 6,191,723 | B1 | * | 2/2001 | Lewis | ............................. 341/166 |
| 2005/0141263 | A1 | * | 6/2005 | Umeda et al. | ................. 365/149 |
| 2007/0262966 | A1 | * | 11/2007 | Nishimura et al. | ........... 345/173 |
| 2009/0046827 | A1 | * | 2/2009 | Tasher et al. | ..................... 377/19 |

FOREIGN PATENT DOCUMENTS

JP          10-124233          5/1998

* cited by examiner

*Primary Examiner* — Quan-Zhen Wang
*Assistant Examiner* — Tony Davis
(74) *Attorney, Agent, or Firm* — K&L Gates LLP

(57) ABSTRACT

A display device of the invention includes a display panel 10 and a touch panel 22. A detector circuit 50 has switches 411 and 412. Switches 411 and 412 are alternately turned on and off repeatedly in the setting period. Touch detection is performed during a counting period that follows the setting period on the basis of required time until a voltage at the node reaches a reference voltage while the switch 411 is turned off and switch 412 is turned on. Common voltage changes in the setting period while switch 411 is turned off and switch 412 is turned on.

5 Claims, 10 Drawing Sheets

DISPLAY DEVICE AND ELECTRONIC APPARATUS

BACKGROUND

1. Technical Field

The present invention relates to a technique for preventing a reduction in touch detection accuracy due to noise generated in a display panel.

2. Related Art

In display panels using liquid crystal, a liquid crystal capacitor constructed by interposing liquid crystal between a pixel electrode and a common electrode (counter electrode) is arranged so as to correspond to each of the intersections of scanning lines and data lines. A voltage according to a gray scale (brightness) is written into each liquid crystal capacitor to perform predetermined display. In recent years, some of the above-described display panels have included a touch panel for detecting a touched state (hereinafter, also referred to as "touch detection"). In the case where a touch panel is provided for a display panel, an image according to an input on the touch panel can be displayed on the display panel. Accordingly, the convenience of users can be improved.

Disadvantageously, the display panel is a source of generating various noises. The noises propagate to the touch panel and adversely affect touch detection. JP-A-10-124233 discloses a technique for dividing a period of one frame (generally, 16.7 ms) in the display panel into a writing period for display and a detecting period, and performing touch detection on a touch panel in the detecting period to prevent noise generated during the writing period from affecting touch detection on the touch panel.

According to this technique, however, touch detection is largely constrained because the detection on the touch panel is limited to once every frame. Recently, in order to suppress voltage swings in the data lines during AC driving of the liquid crystal capacitors, a voltage across the common electrode has been alternately switched between a low voltage and a high voltage. Unfortunately, an influence of noise associated with switching of the voltage across the common electrode is not negligible.

SUMMARY

An advantage of some aspects of the invention is to provide a display device with a touch panel in which touch detection on the touch panel is not limited to once every frame and which is hardly susceptible to noise associated with switching of a voltage across a common electrode, and an electronic apparatus.

According to an aspect of the invention, a display device includes the following elements: A display panel includes a plurality of pixels each having a gray scale according to the difference voltage between a voltage applied to an associated pixel electrode and a voltage applied to a common electrode, the common electrode facing the pixel electrodes. A driver circuit supplies data signals to the pixel electrodes and supplies a common signal alternately switched between a first voltage and a second voltage higher than the first voltage to the common electrode. A touch panel substrate is laminated on the display panel and includes a detection electrode. A detector circuit performs touch detection on the detection electrode. The detector circuit includes a constant current source that maintains current flowing between a power supply line and a predetermined node constant, a first switch that is disposed between the detection electrode and the node and is turned on or off, a second switch that is disposed between the detection electrode and a grounding line and is turned on or off, and a capacitor interposed between the node and the grounding line. The detector circuit has a settling period and a counting period. In the settling period, an operation of alternately turning on and off the first and second switches is repeated. In the counting period following the settling period, touch detection on the detection electrode is performed on the basis of time required until a voltage at the node reaches a preset reference voltage while the first switch is turned off and the second switch is turned on. The driver circuit switches the common signal between the voltages while the second switch is turned on in the settling period. According to this aspect of the invention, the display device includes the display panel that includes the pixels each having a gray scale according to the difference voltage between a voltage applied to the corresponding pixel electrode and a voltage applied to the common electrode, the common electrode facing the pixel electrodes, the driver circuit that supplies data signals to the pixel electrodes and supplies the common signal alternately switched between a low voltage and a high voltage to the common electrode, the touch panel substrate that is laminated on the display panel and includes the detection electrode, and the detector circuit that performs touch detection on the detection electrode. The detector circuit includes the constant current source that maintains current flowing between the power supply line and the predetermined node constant, the first switch that is disposed between the detection electrode and the node and is turned on or off, the second switch that is disposed between the detection electrode and the grounding line and is turned on or off, and the capacitor interposed between the node and the grounding line. In the settling period, the operation of alternately turning on and off the first and second switches is repeated. After that, in the counting period, while the first switch is turned off and the second switch is turned on, touch detection on the detection electrode is performed on the basis of time required until a voltage at the node reaches the preset reference voltage. The driver circuit switches the common signal between the voltages while the second switch is turned on in the settling period. According to this aspect of the invention, a voltage at the node in the settling period is settled to a voltage according to a capacitance component in the detection electrode. Since the capacitance component in the detection electrode differs depending on the presence or absence of touch, the presence or absence of touch on the detection electrode can be detected on the basis of time required until a voltage at the node reaches to the reference voltage due to charging of the capacitor by the constant current source. According to this aspect of the invention, since the first switch is turned off in the settling period at the time when the voltage across the common electrode is switched to another voltage, the detection electrode is electrically disconnected from the capacitor. Thus, the detection electrode is hardly susceptible to noise.

In this case, the display device may further include an oscillator that outputs a clock signal, the driver circuit may switch the common signal between the voltages in response to the clock signal, and the first and second switches may be turned on and off in response to a signal, obtained by dividing the frequency of the clock signal, in the settling period (first arrangement). Alternatively, the detector circuit may include an oscillator that outputs a clock signal, the first and second switches may be turned on and off in response to the clock signal in the settling period, and the driver circuit may switch the common signal between the voltages in response to a signal obtained by dividing the frequency of the clock signal (second arrangement). Alternatively, the driver circuit may include an oscillator that outputs a clock signal and switch the common signal between the voltages in response to the clock signal, and the first and second switches may be turned on and off in response to the clock signal in the settling period (third arrangement).

According to another aspect of the invention, an electronic apparatus includes the display device according to the foregoing aspect of the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the present invention will be described below with reference to the drawings.

Figure 1A:
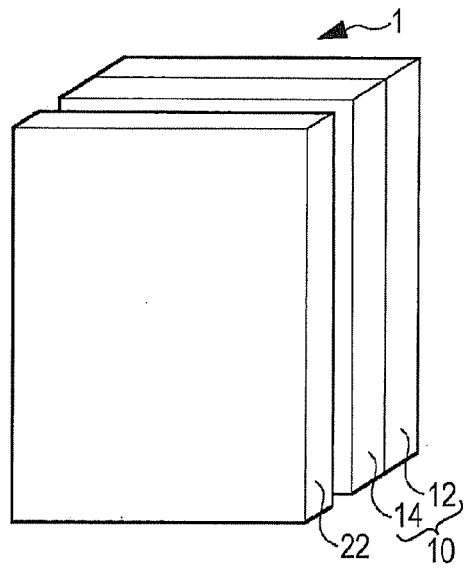
FIGS. 1A and 1B are diagrams showing the structure of a display device according to a first embodiment of the invention.

FIG. 1A illustrates the structure of a display device according to a first embodiment of the invention.

Referring to FIG. 1A, the display device, indicated at 1, has a laminated structure including a display panel 10 and a touch panel substrate 22 having detection electrodes for touch detection. The display panel 10 includes an element substrate 12 and an opposite substrate 14 which are attached to each other with a predetermined space therebetween, and further includes a liquid crystal layer disposed in the space between those substrates. In FIG. 1A, the display panel 10 is separated from the touch panel substrate 22 for the convenience of explanation. Actually, the display panel 10 is in tight contact with the touch panel substrate 22.

Figure 1B:
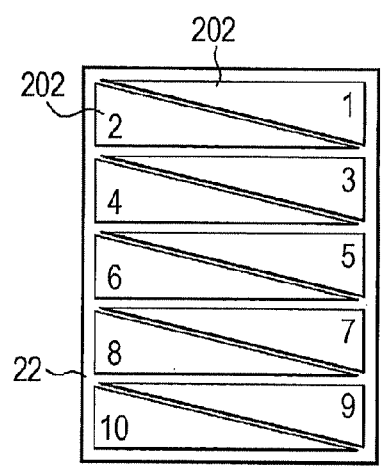

The touch panel substrate 22 has a plurality of (in the present embodiment, ten) detection electrodes 202 composed of a transparent conducting layer, as shown in FIG. 1B. In this embodiment, the detection electrodes 202 each having a right-angled triangular shape are arranged such that five pairs of the opposed electrodes 202 with the hypotenuses facing each other are aligned in the vertical direction in FIG. 1B. Alternatively, the detection electrodes 202 having, for example, a rectangular shape may be arranged in a matrix.

Figure 2:
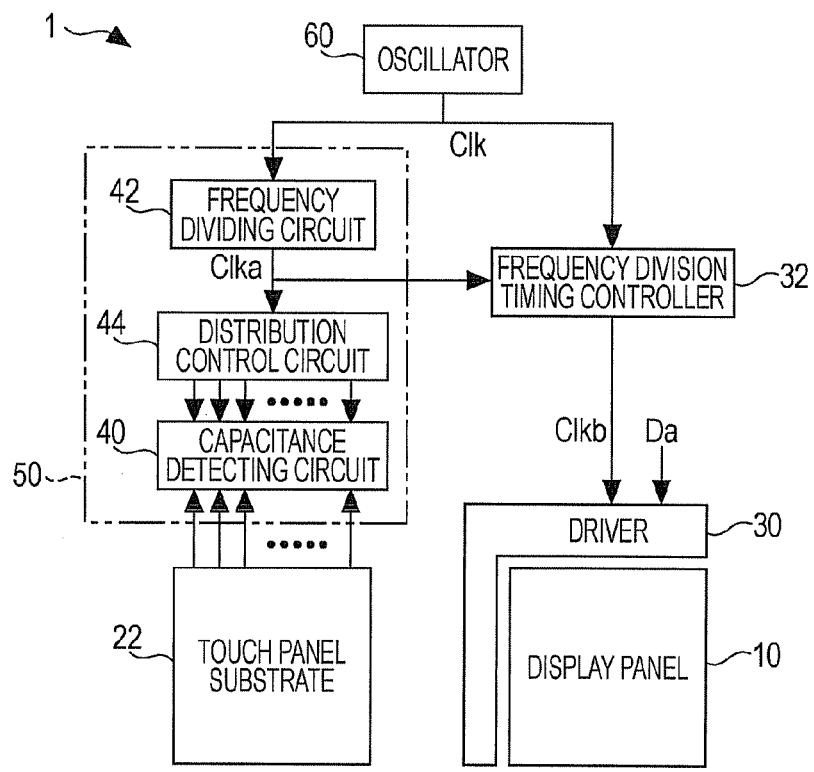
FIG. 2 is a block diagram illustrating the structure of the display device.

FIG. 2 is a block diagram showing the electric structure of the display device 1.

Referring to FIG. 2, an oscillator 60 outputs a clock signal Clk having a predetermined frequency (12 MHz).

A detector 50 for a touch panel is an IC chip and includes a capacitance detecting circuit 40, a frequency dividing circuit 42, and a distribution control circuit 44. The capacitance detecting circuit 40 is connected to the respective detection electrodes 202 and outputs a signal indicative of a time count value according to a capacitance in each detection electrode 202. The frequency dividing circuit 42 divides the frequency of the clock signal Clk by four to output a signal Clka. The distribution control circuit 44 distributes the signal Clka as signals Ck1 to Ck10 in a settling period in accordance with selection of any of the detection electrodes 202.

A frequency division timing controller 32 supplies a signal Clkb, obtained by dividing the frequency of the clock signal Clk by 38 and performing timing control as will be described later, to a driver 30 that drives the display panel 10.

Figure 3:
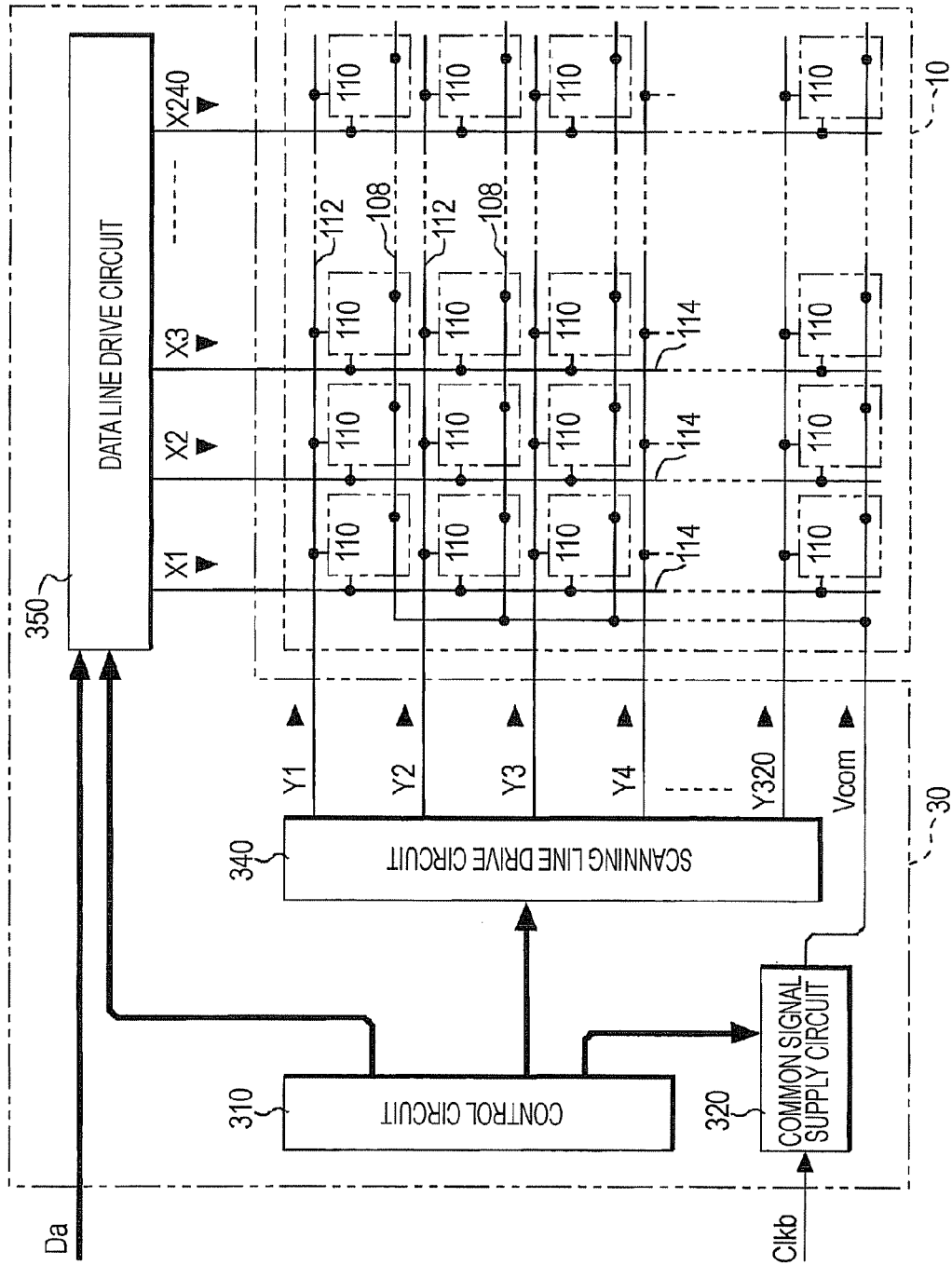
FIG. 3 is a diagram showing the electric structure of a display panel included in the display device.

The display panel 10 and the driver 30 will now be described. FIG. 3 is a block diagram illustrating the structure of the display panel 10 and that of the driver 30.

Referring to FIG. 3, in the display panel 10 in accordance with this embodiment, 320 scanning lines 112 and 240 data lines 114 are arranged such that the scanning lines 112 extend along the rows (i.e., in the X direction) and the data lines 114 extend along the columns (i.e., in the Y direction). In addition, a pixel 110 is arranged so as to correspond to each of the interconnections of the first to 320th scanning lines 112 and the first to 240th data lines 114. In this embodiment, therefore, the pixels 110 are arranged in a matrix of 320 rows×240 columns in the display panel 10. However, the present invention is not limited to this arrangement.

In the embodiment, a common signal supply circuit 320 supplies a common signal Vcom to a common electrode 108. The common electrode 108 is shared among all the pixels 110.

Figure 4:
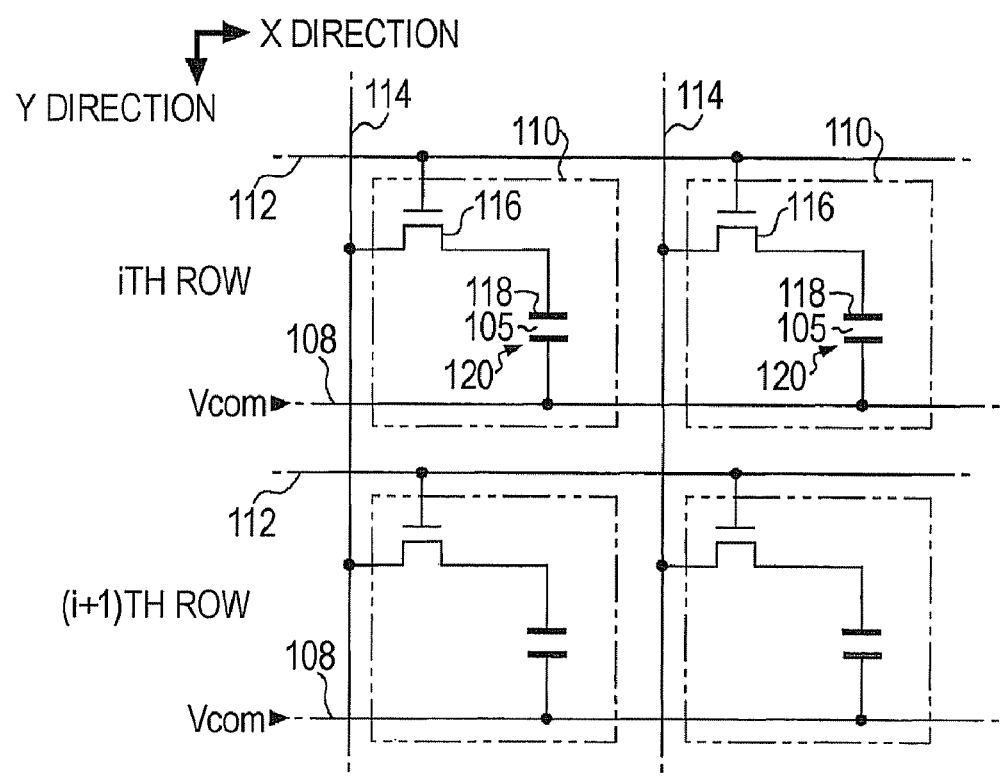
FIG. 4 is a diagram of the structure of each pixel in the display panel.

Referring to FIG. 4, each pixel 110 includes an n-channel thin film transistor (hereinafter, simply abbreviated to "TFT") 116 and a liquid crystal capacitor 120. The gate electrode of each TFT 116 is connected to the corresponding scanning line 112, the source electrode thereof is connected to the corresponding data line 114, and the drain electrode is connected to a pixel electrode 118.

The pixel electrodes 118 are arranged in the element substrate 12. On the other hand, the common electrode 108 is arranged in the opposite substrate 14 so as to face all the pixel electrodes 118. A liquid crystal layer 105 is interposed between the common electrode 108 and the pixel electrodes 118. Therefore, the liquid crystal capacitor 120, composed of the corresponding pixel electrode 118, the common electrode 108, and the liquid crystal layer 105, is arranged for each pixel 110.

The liquid crystal mode is set to the normally black mode. In other words, when the effective value of a voltage held by the liquid crystal capacitor 120 is zero, the transmittance ratio of light passing between the pixel electrode 118 and the common electrode 108 becomes a minimum value (the darkest state). As the effective value increases, the transmittance ratio gradually increases. Accordingly, light emitted from a backlight unit (not shown) passes through each pixel 110 at a transmittance ratio according to the effective value of a voltage held by the corresponding liquid crystal capacitor 120. Therefore, a voltage according to a gray scale is held by the liquid crystal capacitor 120 in each pixel 110, so that a desired image can be displayed.

Again referring to FIG. 3, the driver 30 includes a control circuit 310, the common signal supply circuit 320, a scanning line drive circuit 340, and a data line drive circuit 350. The control circuit 310 outputs various control signals to control the common signal supply circuit 320, the scanning line drive circuit 340, and the data line drive circuit 350.

Figure 5:
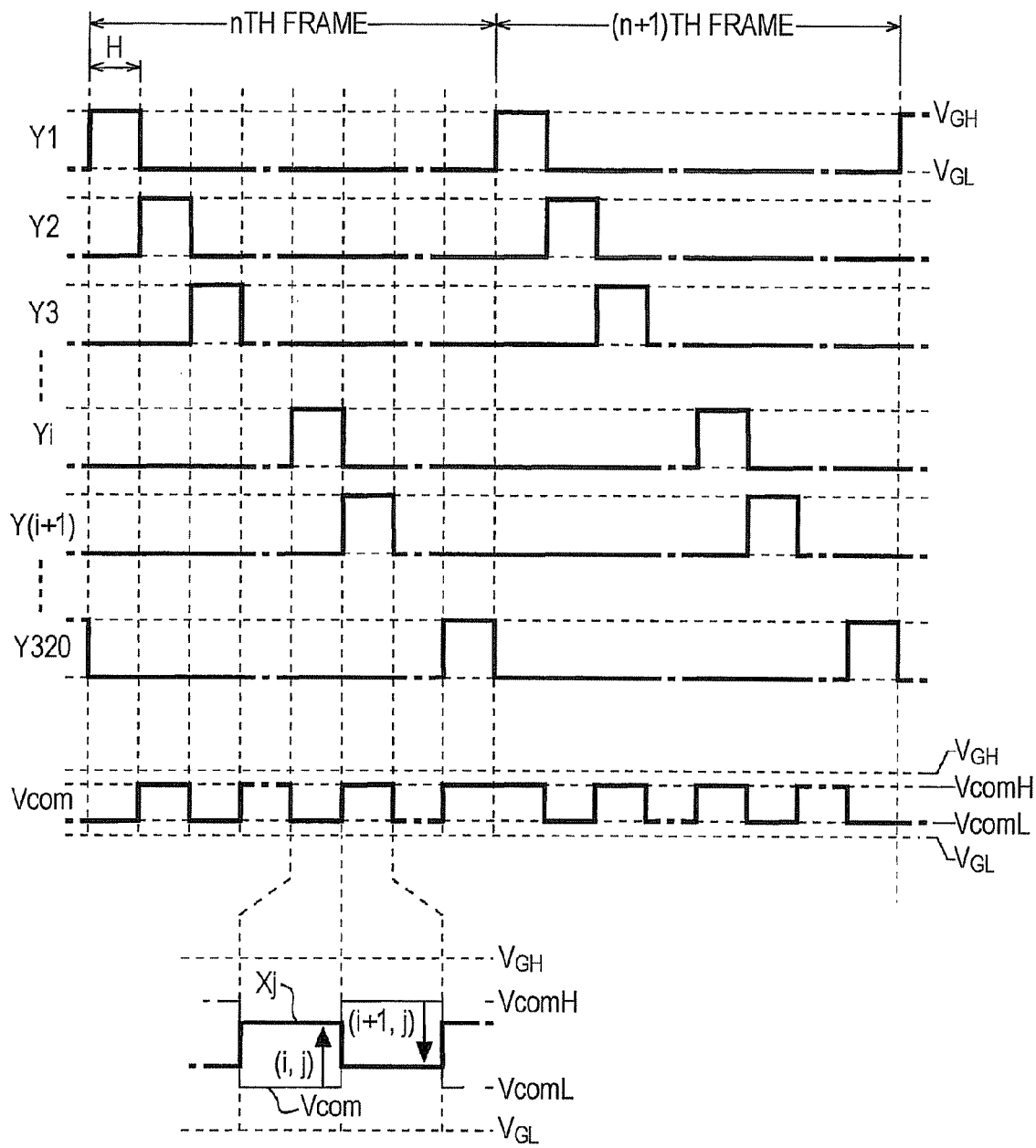
FIG. 5 is a diagram showing an operation of the display panel in the display device.

The scanning line drive circuit 340 supplies scanning signals Y1, Y2, Y3, ..., and Y320 to the first, second, third, ..., and 320th scanning lines 112 for a period of one frame, respectively. Specifically, as shown in FIG. 5, the scanning line drive circuit 340 sequentially selects the scanning lines 112 in order from the top, i.e., in this order of the first, second, third, ..., and 320th lines for the period of one frame such that a single scanning line 112 is selected every horizontal scanning period (H). The scanning line drive circuit 340 supplies a selection voltage $V_{GH}$ as a scanning signal at a high level (H) to the selected scanning line and supplies a voltage $V_{GL}$ as a scanning signal at a low level (L) to each of the other scanning lines.

In the embodiment, the term "one frame" means a period of time required to display one image. One frame corresponds to a period of time required until the 320th scanning line is selected after the first scanning line is selected, as shown in FIG. 5.

The data line drive circuit 350 supplies a data signal to each of the first to 240th data lines 114 such that the data signal with a voltage, which is based on a gray scale of a pixel and is also based on a writing polarity designated by the control circuit 310, is supplied to each pixel 110 connected to the scanning line 112 applied with the selection voltage from the scanning line drive circuit 340.

Specifically, the data line drive circuit 350 has storage areas (not shown) corresponding to the respective pixels arranged in a matrix of 320 rows×240 columns such that each storage area stores display data Da to designate a gray scale (brightness) of the corresponding pixel 110. In this case, just before the application of the selection voltage to a certain scanning line 112, the data line drive circuit 350 reads the display data Da of each pixel 110 connected to the scanning line 112 from the corresponding storage area, converts a voltage on the basis of the gray scale and the writing polarity designated by the read display data, and supplies the voltage as a data signal to the data line 114 in accordance with the timing at which the selection voltage is applied to the scanning line. The data line drive circuit 350 performs this supply operation on the first to 240th data lines 114 related to the selected scanning line 112 in parallel.

As for the display data Da stored in each storage area, when display content is changed, an external host circuit (not shown) supplies a write address and changed display data Da, so that the display data Da is rewritten.

In the embodiment, the writing polarity for the pixels is reversed every row, i.e., a row reversal (also called line reversal or scanning line reversal) driving method is performed. Assuming that the positive polarity is assigned to the pixels connected to the odd-numbered (first, third, fifth, ..., and 319th) scanning lines and the negative polarity is assigned to the pixels connected to the even-numbered (second, fourth, sixth, ..., and 320th) scanning lines for a period of a certain frame (indicated as "nth frame"), as shown in FIG. 5, the positive polarity is assigned to the pixels connected to the odd-numbered scanning lines and the positive polarity is assigned to the pixels connected to the even-numbered scanning lines in the next frame (indicated as "(n+1)th frame"). The reason why the writing polarity is reversed every frame is to prevent the degradation of the liquid crystal layer due to the application of a DC component.

The common signal supply circuit 320 supplies the common signal Vcom with the following voltage to the common electrode 108. When the positive polarity is designated in the horizontal scanning period (H) during which a certain scanning line is selected, the common signal supply circuit 320 sets the common signal Vcom to a voltage VcomL. When the negative polarity is designated, the common signal supply circuit 320 sets the common signal Vcom to a voltage VcomH.

The voltages VcomL and VcomH, the voltage $V_{GL}$ at the level "L", and the selection voltage $V_{GH}$ at the level "H" have the following relation: $V_{GL}<VcomL<VcomH<V_{GH}$.

In this embodiment, assuming that a frame frequency is 60 Hz, a period of one frame is 16.7 ms and a horizontal scanning period (H) is 50 μs that is 1/320 of one frame. Therefore, the common signal supply circuit 320 may switch the common signal Vcom between the voltages on the basis of 16 pulses of the signal Clkb measured as one horizontal scanning period (H), the signal Clkb being obtained by dividing the frequency, 12 MHz, of the clock signal Clk by 38.

An operation of the display panel 10 will now be explained. According to this embodiment, as described above, in the nth frame, the first scanning line 112 is first selected and the scanning signal Y1 is set to the voltage $V_{GH}$ at the level "H". Since positive writing is designated in the odd-numbered scanning lines in the nth frame, the common signal Vcom is set to the voltage VcomL in the horizontal scanning period (H) during which the scanning signal Y1 is held at the level "H". In addition, when the scanning signal Y1 becomes the level "H" in the nth frame, the data line drive circuit 350 supplies data signals X1, X2, X3, ..., and X240 to the first, second, third, ..., and 240th data lines 114, respectively, the voltage of each data signal being higher than the voltage VcomL by a voltage designated by the display data Da for the corresponding pixel located at the first row and the first, second, third, ..., or 240th column. Consequently, for example, a data signal Xj supplied to the jth data line 114 is set to a voltage that becomes higher than the voltage VcomL as the gray scale designated by the display data Da of the corresponding pixel 110 at the first row and the jth column becomes brighter. When the scanning signal Y1 becomes the level "H", the TFTs 116 in the pixels at the first row and the first to 240th columns are turned on, so that the data signals X1, X2, X3, ..., and X240 are supplied to the corresponding pixel electrodes 118. Consequently, the difference voltage between the voltage of the data signal and the voltage VcomL of the common signal Vcom, i.e., a positive voltage according to a gray scale is written into each of the liquid crystal capacitors 120 at the first row and the first to 240th columns.

Subsequently, in the nth frame, the second scanning line 112 is selected and the scanning signal Y2 becomes the level "H". Since negative writing is designated in the even-numbered scanning lines in the nth frame, the common signal Vcom is set to the voltage VcomH in the next horizontal scanning period (H) during which the scanning signal Y2 is held at the level "H".

When the scanning signal Y2 becomes the level "H", the data line drive circuit 350 supplies the data signals X1, X2, X3, ..., and X240 to the first, second, third, ..., and 240th data lines 114, respectively, the voltage of each data signal being higher than the voltage VcomH by a voltage designated by the display data Da for the corresponding pixel located at the second row and the first, second, third, ..., or 240th column. Consequently, for example, the data signal Xj supplied to the jth data line 114 is set to a voltage that becomes lower than the voltage VcomH as the gray scale designated by the display data Da of the corresponding pixel 110 at the second row and the jth column becomes brighter. When the scanning signal Y2 becomes the level "H", the TFTs 116 in the pixels at the second row and the first to 240th columns are turned on, so that data signals X1, X2, X3, . . . , and X240 are supplied to the corresponding pixel electrodes 118. Consequently, a negative voltage according to a gray scale is written into each of the liquid crystal capacitors 120 at the second row and the first to 240th columns.

In the nth frame, the similar operation is repeated with respect to the subsequent rows. In the odd-numbered rows, a positive voltage according to a gray scale is written and held. In the even-numbered rows, a negative voltage according to a gray scale is written and held. In the next (n+1)th frame, the similar operation is repeated. Since the writing polarity is reversed, a negative voltage according to a gray scale is written and held in the odd-numbered rows and a positive voltage according to a gray scale is written and held in the even-numbered rows.

FIG. 5 shows a voltage waveform of the data signal Xj supplied to the jth data line 114 in relation to scanning signals Yi and Y(i+1).

When the positive writing polarity is designated in a horizontal scanning period (H) during which the ith scanning line is selected, the common signal Vcom to be supplied to the common electrode 108 becomes the voltage VcomL in the horizontal scanning period (H). The data signal Xj with a voltage (indicated by the arrow "↑" in FIG. 5) higher than the voltage VcomL by a voltage according to a gray scale of the pixel at the ith row and the jth column is supplied to the jth data line 114. Consequently, the difference voltage between the voltage of the data signal Xj and the voltage VcomL of the common electrode 108, i.e., a positive voltage according to the gray scale is written into the liquid crystal capacitor 120 at the ith row and the jth column.

In the next horizontal scanning period (H) during which the next (i+1)th scanning line is selected, the writing polarity is reversed and negative writing is designated. Accordingly, the common signal Vcom becomes the voltage VcomH in a horizontal scanning period (H) during which the scanning signal Y(i+1) becomes the level "H". The data signal Xj with a voltage (indicated by the arrow "↓" in FIG. 5) lower than the voltage VcomH by a voltage according to a gray scale of the pixel at the (i+1)th row and the jth column is supplied to the jth data line 114. Thus, the difference voltage between the voltage of the data signal Xj and the voltage VcomH of the common electrode 108, i.e., a negative voltage according to the gray scale is written into the liquid crystal capacitor 120 at the (i+1)th row and the jth column.

The touch panel in the display device 1 will now be described. This touch panel includes the touch panel substrate 22 and the capacitance detecting circuit 40 for detecting a capacitance in each of the detection electrodes 202 arranged in the touch panel substrate 22.

Figure 6:
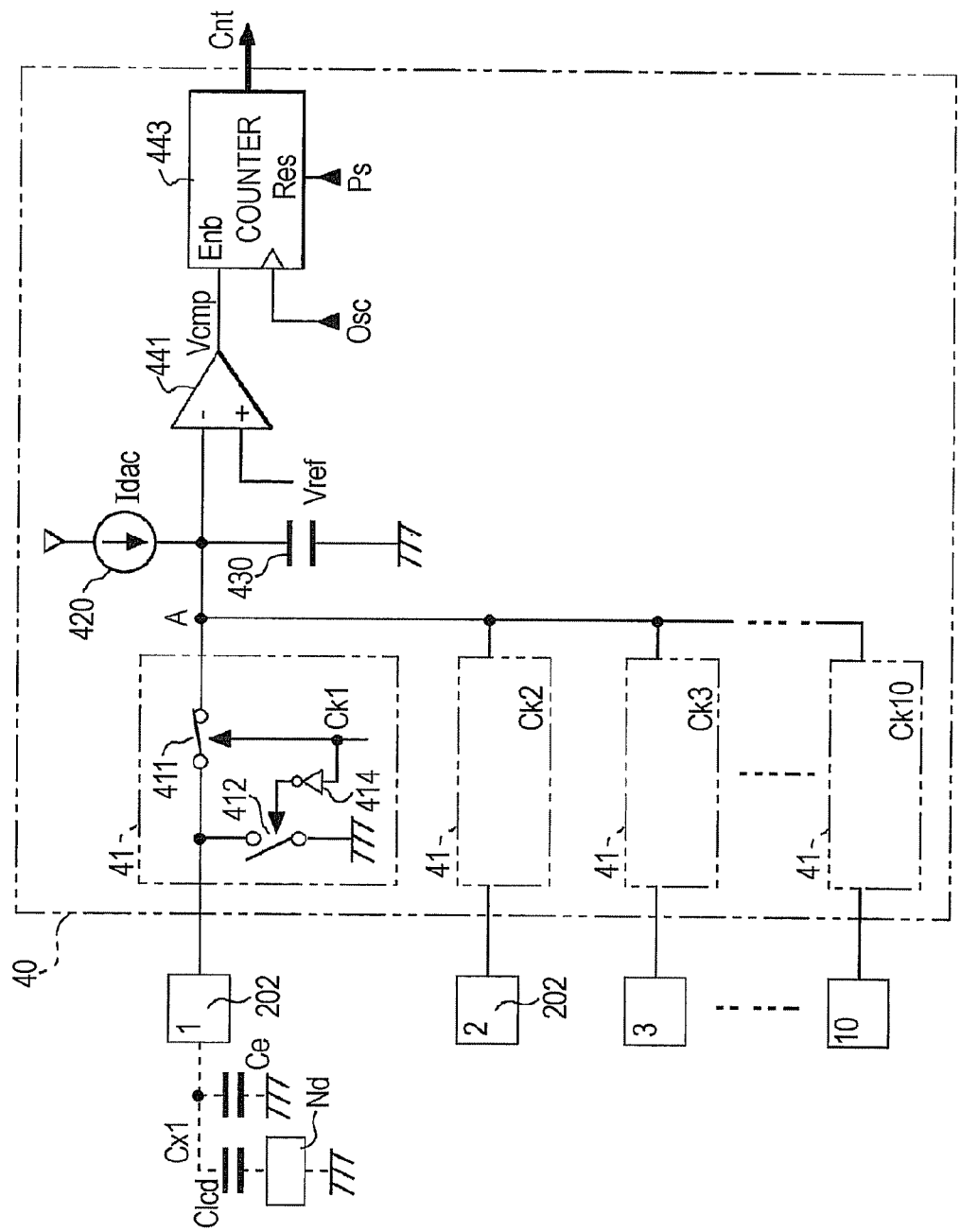
FIG. 6 is a diagram illustrating the electric structure of a touch panel in the display device.

FIG. 6 is a block diagram of the electric structure of essential part of the touch panel.

Referring to FIG. 6, the capacitance detecting circuit 40 includes a plurality of switch groups 41 corresponding to the ten detection electrodes 202, a constant current source 420, a capacitor 430, a comparator 441, and a counter 443.

The switch groups 41 corresponding to the first to tenth detection electrodes 202 have the same structure, except that the signals Ck1 to Ck10 are supplied to the switch groups 41, respectively. Accordingly, the first switch group 41 corresponding to the first detection electrode 202 will be described as an example. The first switch group 41 includes a switch 411, another switch 412, and an inverter 414. One terminal of the switch 411 is connected to the first detection electrode 202. The other switch 412 is arranged between the one end of the first switch 411 (adjacent to the detection electrode 202) and a grounding line at a potential Gnd and is turned on or off. The inverter 414 outputs a negative signal of the signal Ck1.

When the signal Ck1 is at the level "H", the switch 411 is turned on. When the signal Ck1 is at the level "L", the switch 411 is turned off. On the other hand, when the negative signal of the signal Ck1 is at the level "H", the switch 412 is turned on. When the negative signal is at the level "L", the switch 412 is turned off. Therefore, the switches 411 and 412 are constructed such that when one of the switches 411 and 412 is turned on, the other switch is turned off.

The other switch groups 411 corresponding to the second to tenth detection electrodes 202 have the same structure as that of the first switch group 41 corresponding to the first detection electrode 202. Those switch groups 41 receive the signals Ck2 to Ck10 instead of the signal Ck1, respectively.

In the switch groups 41 corresponding to the first to tenth detection electrodes 202, the other terminals of the respective switches 411 are connected in common. For the sake of convenience, the common node is indicated as "node A".

The constant current source 420 supplies a constant current Idac from a high-voltage supply line to the node A. The capacitor 430 is interposed between the node A and the grounding line.

The comparator 441 compares a voltage at the node A with a reference voltage Vref. When the voltage at the node A is lower than the reference voltage Vref, the comparator 441 outputs a signal Vcmp at the level "H". When the voltage at the node A is equal to or higher than the reference voltage Vref, the comparator 441 outputs the signal Vcmp at the level "L".

When the signal Vcmp is at the level "H", the counter 443 is permitted to perform counting, i.e., count pulses of a clock signal Osc. The counter 443 outputs a signal indicative of a count value Cnt to an external control circuit (not shown). The count value Cnt obtained by the counter 443 is reset to zero in response to a pulse signal Ps that is initially supplied in a counting period, which will be described later.

Figure 7:
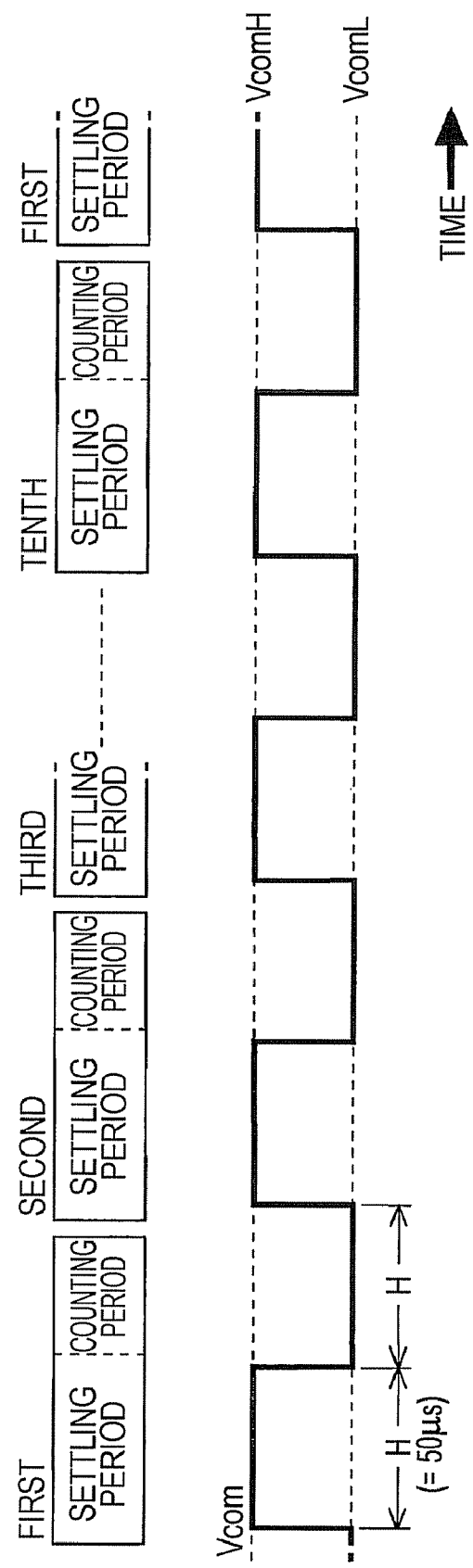
FIG. 7 is a diagram showing the operation of the touch panel.

A capacitance detecting operation will now be described. FIG. 7 illustrates allocation of the detecting operation of the capacitance detecting circuit 40. Referring to FIG. 7, the capacitance detecting circuit 40 repeatedly performs the capacitance detecting operation on the detection electrodes 202 in this order of the first, second, third, . . . , and tenth detection electrodes 202. Time required for detection of a capacitance in the detection electrode 202 is divided into a settling period and a counting period.

The operation of detecting a capacitance in the first detection electrode 202 will now be described with reference to FIG. 8.

Figure 8:
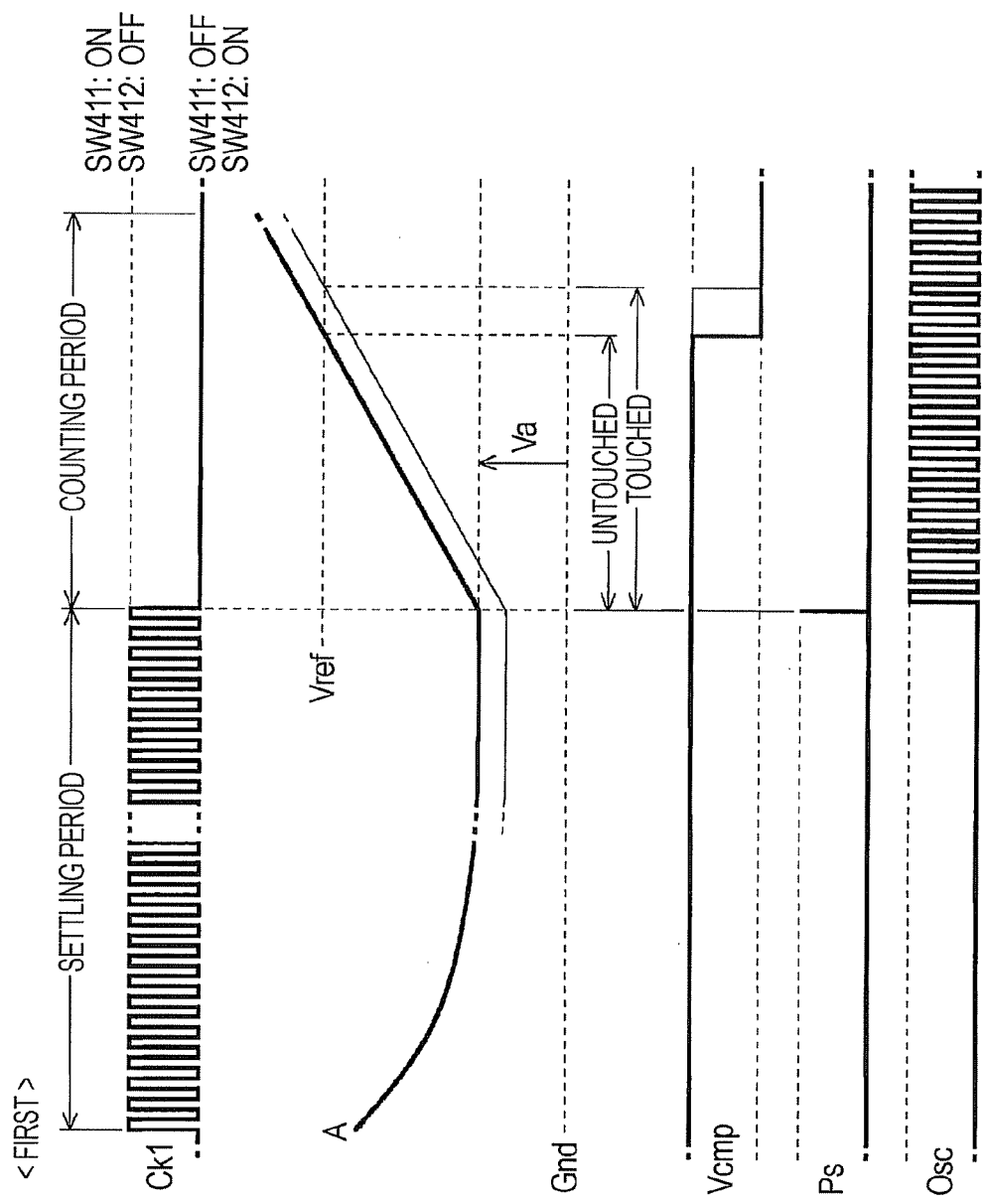
FIG. 8 is a diagram illustrating the operation of the touch panel.

Referring to FIG. 8, in the settling period of the time for detection of a capacitance in the first detection electrode 202, the signal Ck1 is alternately switched between the level "H" and the level "L". The signal Ck1 in the settling period is obtained by dividing the frequency of the clock signal Clk by four. Therefore, the frequency of the signal Ck1 in the settling period is 3 MHz.

The touch panel substrate 22 in which the detection electrodes 202 are arranged is laminated on the display panel 10. Accordingly, the detection electrodes 202 have various parasitic capacitors. Again referring to FIG. 6, Clcd indicates a coupling capacitor with (various electrodes in) the display panel 10 and Ce indicates a composite capacitor of stray capacitors. The capacitor Clcd is connected to the potential Gnd via various electrodes in the display panel 10, e.g., the common electrode 108, the scanning lines 112, and the data lines 114. In this instance, for the sake of convenience, a composite capacitor of the capacitor Clcd and the capacitor Ce related to the first detection electrode 202 is indicated as Cx1.

Although the capacitors parasitic only on the first detection electrode 202 are shown in FIG. 6, the second to tenth detection electrodes 202 have similarly parasitic capacitors.

When the signal Ck1 is at the level "H" in the settling period, the switch 411 is turned on and the switch 412 is turned off. Consequently, the capacitor Cx1 is charged by the constant current Idac. At that time, since the capacitor Cx1 has a sufficiently small capacitance, the current flowing through the capacitor Cx1 immediately reaches zero.

When the signal Ck1 goes to the level "L" in the settling period, the switch 411 is turned off and the switch 412 is turned on, thus causing discharge. Consequently, discharge current flows through the capacitor Cx1. After a while, the discharge is completed and a discharge current reaches zero.

In the settling period, a charge stored in the capacitor Cx1 when the signal Ck1 is at the level "H" is equal to a charge discharged from the capacitor Cx1 when the signal Ck1 is at the level "L". Therefore, when turning on and off the switches 411 and 412 is repeated at a constant rate, a charge current mean value is substantially equal to a discharge current mean value. In other words, the capacitor Cx1 can be regarded as a resistor (switched capacitor circuit), through which mean-value charge and discharge currents flow, from the viewpoint of a power supply voltage. Therefore, when the settling period is sufficiently long, an average voltage Va at the node A is settled to a value of Idac/(fs·Cx1), as shown in FIG. 8. In this instance, a frequency fs and the constant current Idac are set so that the voltage {Idac/(fs·Cx1)} is lower than the voltage Vcmp, serving as a reference. Under this setting, the signal Vcmp output from the comparator 441 is held at the level "H" at the end of the settling period.

When the counting period starts at the end of the settling period, the signal Ck1 becomes the level "L". Consequently, the switch 411 is fixed to the OFF state and the switch 412 is fixed to the ON state, so that the detection electrode 202 is separated from the node A and is grounded at the potential Gnd. Accordingly, the voltage at the node A increases from the voltage {Idac/(fs·Cx1)} at a constant rate because the capacitor 430 is charged by the constant current Idac.

In addition, the pulse signal Ps is output and the clock signal Osc is also output from an oscillator (not shown) at the start of the counting period. Consequently, the count value Cnt of the counter 443 is reset to zero. Furthermore, since the signal Vcmp is at the level "H" and the counting operation is permitted, the counter 443 counts up pulses of the clock signal Osc.

When the voltage at the node A rises to the reference voltage Vref, the signal Vcmp goes to the level "L". Accordingly, the counter 443 is not permitted to perform the counting operation. Therefore, the count value Cnt indicates the frequency of the clock signal Osc until the voltage at the node A reaches the reference voltage Vref after the start of the counting period.

In this case, when a finger touches the first detection electrode 202, the capacitance Ce apparently increases due to electrostatic coupling with the finger, so that the composite capacitance Cx1 also increases. Accordingly, the voltage Va at the node A is lowered, as shown by the thin line in FIG. 8, at the end of the settling period. The lower voltage results in proportionally longer time required until the voltage Va reaches the reference voltage Vref. Thus, the count value Cnt increases.

Therefore, the external control circuit determines as to whether the count value Cnt counted by the counter 443 is larger than a value in an untouched state as a reference, so that whether a finger touches the first detection electrode 202 can be detected.

The above-described operation is repeatedly performed in the order of the first to tenth detection electrodes 202, so that whether each detection electrode 202 is touched can be detected.

The relation between the detecting operation of the capacitance detecting circuit 40 and the common signal Vcom will now be explained. As described above, the horizontal scanning period (H) is 50 μs in this embodiment. Accordingly, in the same frame, the common signal Vcom is alternately switched between the voltage VcomH and the voltage VcomL every horizontal scanning period (H), as shown in FIG. 7.

In the embodiment, the horizontal scanning period (H) is shorter than the settling period allocated to detection by the capacitance detecting circuit 40. Accordingly, the voltage of the common signal Vcom is always switched to the other voltage at the end of the settling period for detection of a capacitance in any detection electrode 202, as shown in FIG. 7.

As described above, the distribution control circuit 44 distributes the signal Clka, obtained by dividing the frequency of the clock signal Clk by four, as each of the signals Ck1 to Ck10 in the settling period, to the switch group 41 corresponding to a target detection electrode 202 in which a capacitance is to be detected. Therefore, the logic level of each of the signals Ck1 to Ck10 is the same as that of the signal Clka only in the settling period.

On the other hand, the frequency division timing controller 32 outputs the signal Clkb obtained by dividing the frequency of the clock signal Clk by 38 and performing timing control as follows: The frequency division timing controller 32 performs timing control on the signal Clkb so that the logic level of the signal Clkb changes while the signal Clka is at the level "L".

Accordingly, the signal Clkb of the frequency division timing controller 32 is obtained by dividing the frequency of the clock signal Clk by approximately 38. When the logic level of the signal Clkb changes, the signal Clka, serving as the base of the signals Ck1 to Ck10, is at the level "L". Therefore, in the settling period, the voltage of the common signal Vcom changes only when the signals Ck1 to Ck10 are at the level "L".

Figure 9:
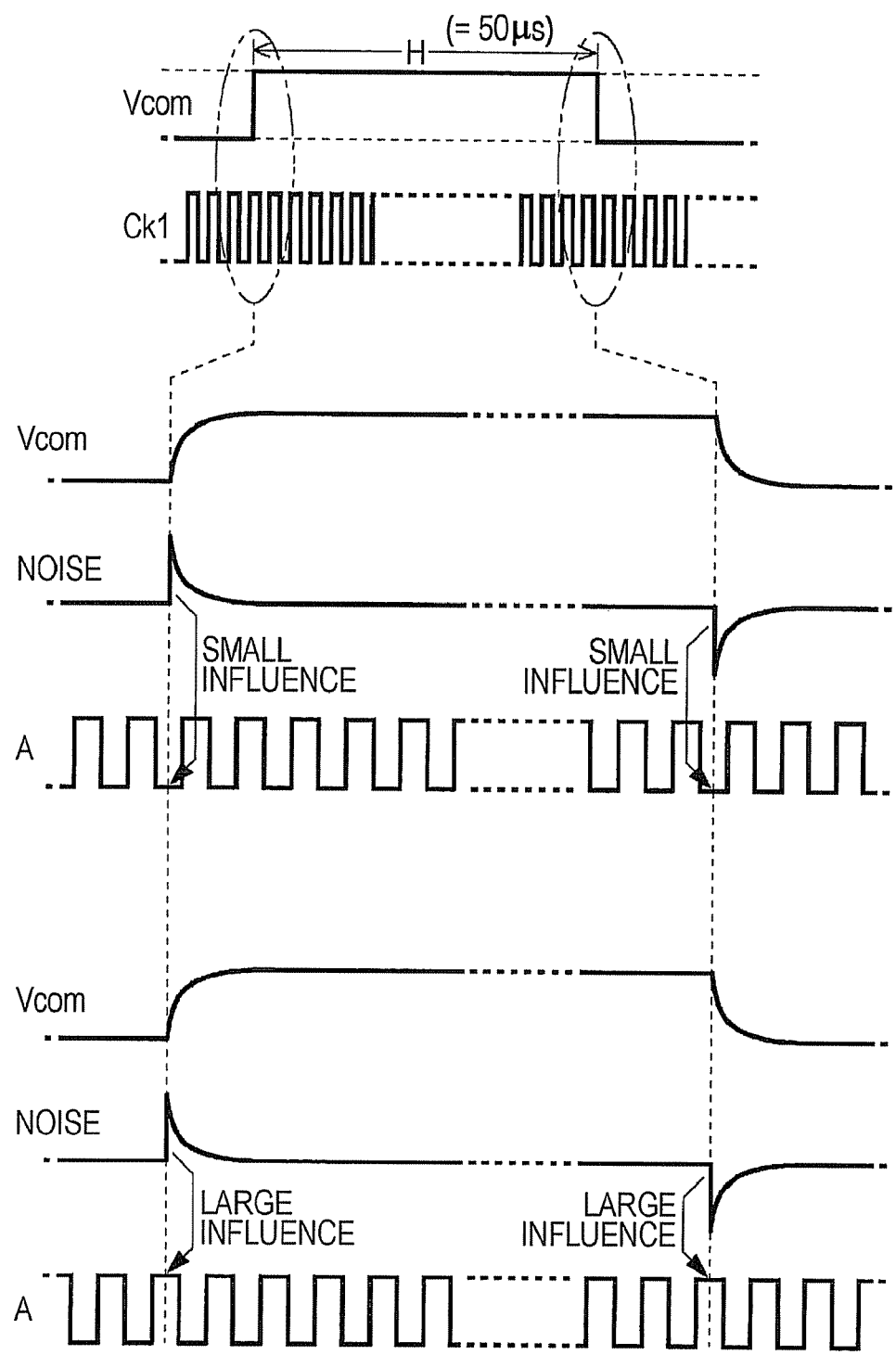
FIG. 9 is a diagram showing the operation of the touch panel.

In this embodiment, the reason why the above-described structure is used is as follows:

Since the common electrode 108 supplied with the common signal Vcom has a wide area in order to face the pixel electrodes 118 of all the pixels, noise associated with switching of the voltage of the common electrode 108 is easily propagated to the detection electrodes 202 arranged in the touch panel substrate 22 via the respective capacitors Clcd. For example, when the signal Ck1 is at the level "H" in the settling period for the first detection electrode 202, the switch 411 is turned on and the switch 412 is turned off. Consequently, noise associated with switching of the voltage of the common signal Vcom is propagated to the node A via the capacitor Clcd, thus affecting a settling voltage, as shown in FIG. 9. When the settling voltage fluctuates, the count value Cnt does not reflect the presence or absence of touch. This results in erroneous detection.

Therefore, this embodiment provides the structure in which the voltage of the common signal Vcom is switched only while the signals Ck1 to Ck10 are at the level "L". For example, when the signal Ck1 is at the level "L", the switch 411 is turned off and the switch 412 is turned on. In this case, even when noise associated with switching of the voltage of the common signal Vcom is propagated through the capacitor Clcd to the detection electrode 202, an influence exerted on the node A is small, as shown in FIG. 9, since the detection electrode 202 is grounded. Advantageously, according to the embodiment, the detection electrode 202 is hardly susceptible to noise associated with switching of the voltage across the common electrode 108, thus preventing a reduction in touch detection accuracy.

Furthermore, since it is unnecessary to divide a frame period for detection, touch detection is not restricted by frames.

In the embodiment, the operation of switching the settling period in capacitance detection based on the clock signal Clk from the oscillator 60 is synchronized with the operation of switching the voltage of the common signal Vcom supplied to the common electrode 108. When display data is externally supplied in accordance with a dot clock signal, the operation of switching the settling period may be synchronized with the operation of switching the voltage of the common signal Vcom in response to the dot clock signal.

Figure 10:
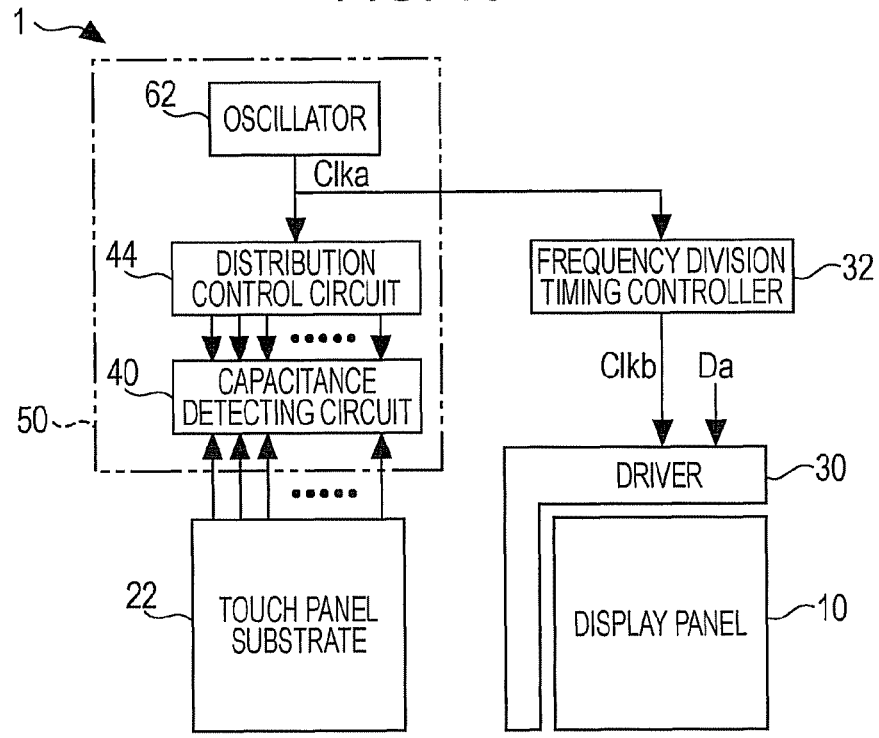
FIG. 10 is a diagram showing the structure of a display device according to a second embodiment of the invention.

A second embodiment of the invention will now be described. FIG. 10 is a block diagram illustrating the structure of a display device 1 according to the second embodiment.

According to the second embodiment, a signal Clka is not obtained by frequency division as shown in FIG. 1 but is generated from an oscillator 62. The oscillator 62, a capacitance detecting circuit 40, and a distribution control circuit 44 constitute a detector 50 in single-chip integrated form.

In the second embodiment, a frequency division timing controller 32 divides the frequency of an input signal by 38 in a manner similar to the first embodiment. The signal Clka, serving as an input signal, has a frequency that is ¼ the frequency of the clock signal Clk in the first embodiment. In the second embodiment, therefore, a common signal supply circuit 320 in a driver 30 may change a voltage of a common signal Vcom every horizontal scanning period (H) equivalent to a period corresponding to four pulses of a clock signal Clkb, which is obtained by dividing the frequency of the signal Clka by 38.

Figure 11:
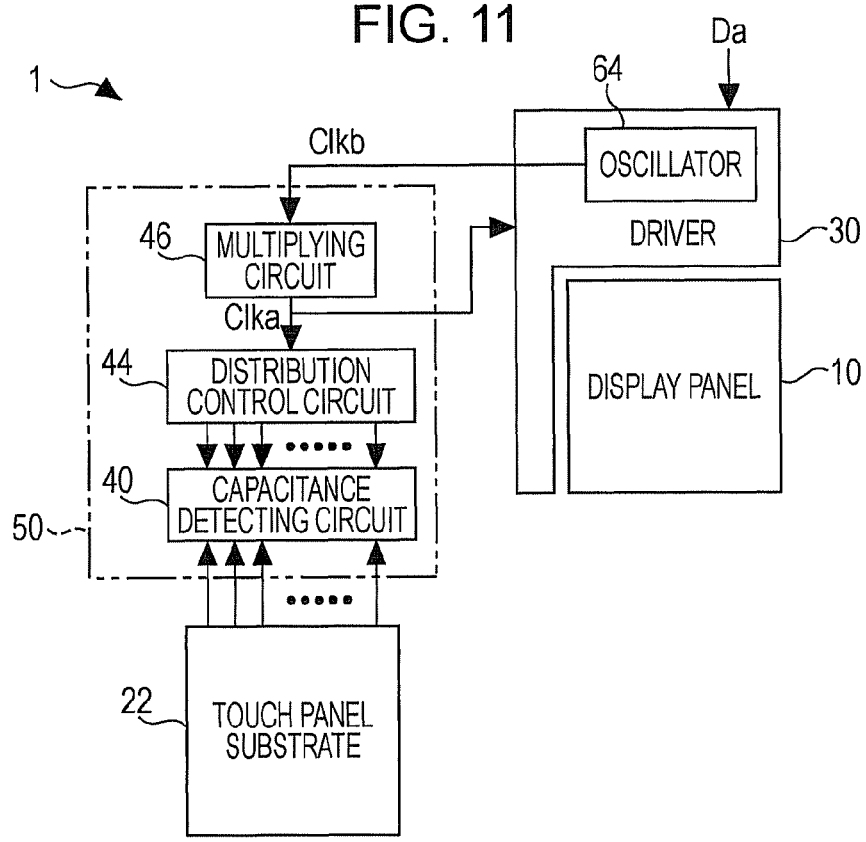
FIG. 11 is a diagram showing the structure of a display device according to a third embodiment of the invention.

A third embodiment of the present invention will now be described. FIG. 11 is a block diagram illustrating the structure of a display device 1 according to the third embodiment.

In the third embodiment, a driver 30 includes therein an oscillator 64 for oscillating a signal corresponding to the signal Clkb, as shown in FIG. 10. Since the frequency of the signal Clkb is lower than the switching frequency of each of switches 411 and 412 in the settling period, a multiplying circuit 46 multiplies the frequency of the signal Clkb and outputs the resultant signal as a signal Clka.

According to the third embodiment, the signal Clka is supplied to the oscillator 64 or a common signal supply circuit 320 in the driver 30 so that a voltage of a common signal is switched while the signal Clka, serving as the base of signals Ck1 to Ck10, is at the level "L". In the third embodiment, the multiplying circuit 46, a capacitance detecting circuit 40, and a distribution control circuit 44 which constitute a detector 50 are integrated on a single chip.

In the above-described embodiments, each liquid crystal capacitor 120 is operated in the normally black mode. The normally white mode in which the brightness of a pixel is high in a voltage non-applied state may be used. In addition, color display may be performed such that three pixels of red (R), green (G), and blue (B) constitute one dot. Furthermore, another color (e.g., emerald green (Eg)) may be added to the above-described three colors and pixels of those four colors may constitute one dot to improve color reproducibility.

An example of an electronic apparatus including the display device 1 according to any of the above-described embodiments will now be described.

Figure 12:
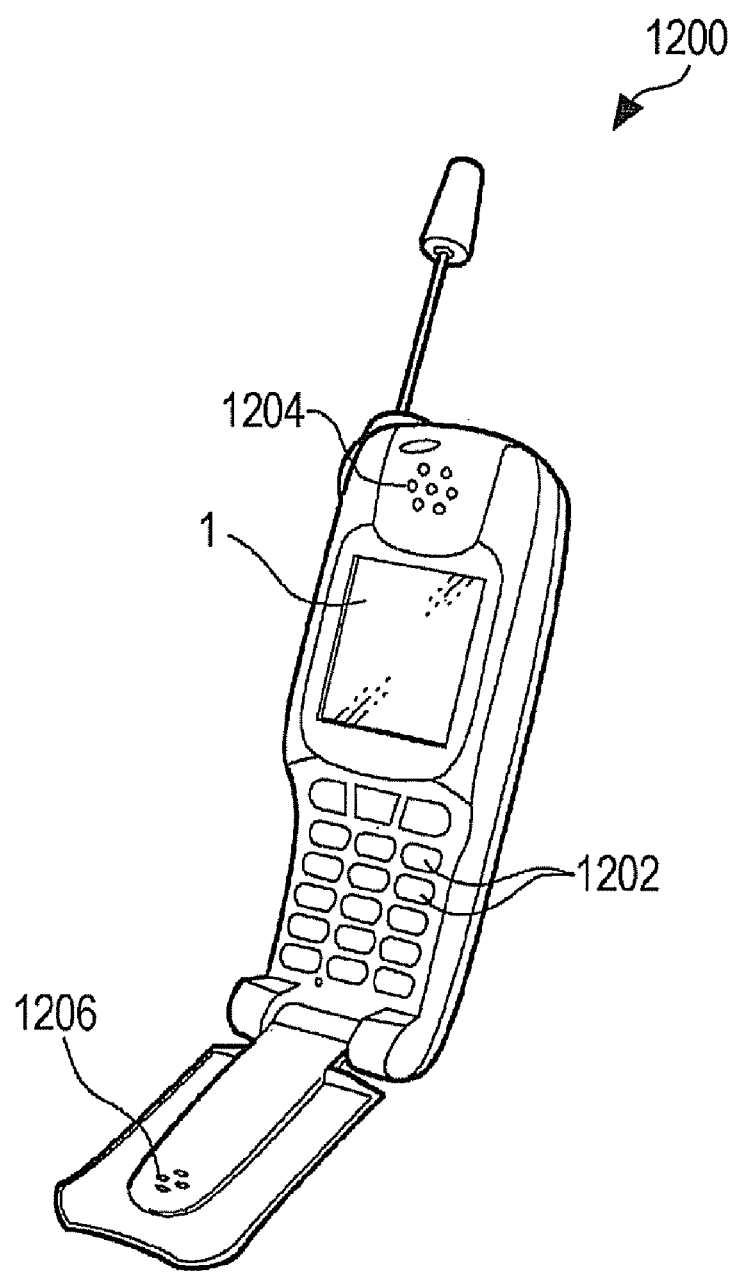
FIG. 12 is a diagram showing the structure of a mobile phone to which the display device according to any of the embodiments is applied.

FIG. 12 is a diagram illustrating the structure of a mobile phone 1200 including the display device 1 according to any of the embodiments. Referring to FIG. 12, the mobile phone 1200 includes a plurality of operation buttons 1202, an earpiece 1204, a mouthpiece 1206, and the above-described display device 1, which is arranged such that the touch panel substrate 22 faces a viewer.

Electronic apparatuses to which the display device 1 is applied may include the mobile phone shown in FIG. 12, a digital still camera, a notebook-sized personal computer, a liquid crystal television, a video recorder, a car navigation system, a pager, an electronic notebook, an electronic calculator, a word processor, a workstation, a videophone, a POS terminal, and a touch panel. The above-described display device 1 may be applied to those various electronic apparatuses.

The entire disclosure of Japanese Patent Application No. 2007-287001, filed Nov. 5, 2007 is expressly incorporated by reference herein.

What is claimed is:
1. A display device comprising:
a display panel including a plurality of pixels each having a gray scale according to the difference voltage between a voltage applied to an associated pixel electrode and a voltage applied to a common electrode, the common electrode facing the pixel electrodes;
a driver circuit that supplies data signals to the pixel electrodes and supplies a common signal alternately switched between a first voltage and a second voltage higher than the first voltage to the common electrode;
a touch panel substrate that is laminated on the display panel and includes a plurality of detection electrodes; and
a detector circuit that performs touch detection on the detection electrodes,
wherein the detector circuit includes
a plurality of switch groups corresponding to the plurality of detection electrodes and connected to a common node within the detector circuit, each switch group including a first switch that is disposed between the corresponding detection electrode and the node and that is turned on or off, and a second switch that is disposed between the corresponding detection electrode and a grounding line that is integral with the detector circuit and that is turned on or off
a constant current source that maintains a constant current flowing between a power supply line and the node, and
a capacitor integral with the detector circuit is positioned outside the switch groups between the node and the grounding line, and between the constant current source and the grounding line,
wherein the detector circuit has a settling period in which alternately turning on and off the first and second switches is repeated and a counting period, which follows the setting period and in which touch detection on the detection electrode is performed on the basis of time required until a voltage at the node reaches a preset reference voltage while the first switch is turned off and the second switch is turned on, and wherein the driver circuit switches the common signal between the voltages while the second switch is turned on in the settling period.

2. The device according to claim 1, further comprising:
an oscillator that outputs a clock signal, wherein the driver circuit switches the common signal between the voltages in response to the clock signal, and
the driver circuit turns the first and second switches on and off in response to a signal, obtained by dividing the frequency of the clock signal, in the settling period.

3. The device according to claim 1, wherein the detector circuit includes an oscillator that outputs a clock signal,
the detector circuit turns the first and second switches on and off in response to the clock signal in the settling period, and
the driver circuit switches the common signal between the voltages in response to a signal obtained by dividing the frequency of the clock signal.

4. The device according to claim 1, wherein the driver circuit includes an oscillator that outputs a clock signal,
the driver circuit switches the common signal between the voltages in response to the clock signal, and
the detector circuit turns the first and second switches on and off in response to the clock signal in the settling period.

5. An electronic apparatus comprising the display device according to claim 1.

* * * * *